United States Patent [19]
Schuneman

[11] Patent Number: 5,410,331
[45] Date of Patent: Apr. 25, 1995

[54] PROCESS FOR GENERATING AND/OR USING A LOOK-UP TABLE

[75] Inventor: Thomas A. Schuneman, Lincoln, Mass.

[73] Assignee: Carmex, Inc., Culver City, Calif.

[21] Appl. No.: 886,559

[22] Filed: May 20, 1992

[51] Int. Cl.$^6$ .............................................. G09G 1/28
[52] U.S. Cl. ...................................... 345/150; 345/153
[58] Field of Search ................... 395/131, 32, 164; 345/131, 132, 164, 22, 88, 153, 155, 150

[56] References Cited

U.S. PATENT DOCUMENTS

| | | | |
|---|---|---|---|
| 4,566,000 | 1/1986 | Goldman et al. | 340/709 |
| 4,734,619 | 3/1988 | Havel | 340/703 |
| 4,763,283 | 8/1988 | Coutrot | 395/131 X |
| 4,835,526 | 5/1989 | Ishii et al. | 340/703 |
| 5,068,644 | 11/1991 | Batson et al. | 340/701 |
| 5,146,211 | 9/1992 | Adams et al. | 340/709 |

FOREIGN PATENT DOCUMENTS

| | | | |
|---|---|---|---|
| 0183246 | 6/1986 | European Pat. Off. | |
| 0090194 | 3/1990 | Japan | 340/709 |
| 0193189 | 7/1990 | Japan | 340/709 |
| 0189693 | 8/1991 | Japan | 340/709 |

*Primary Examiner*—Ulysses Weldon
*Attorney, Agent, or Firm*—Freilich Hornbaker Rosen

[57] ABSTRACT

A process for generating a look-up table for use in displaying a highlight object on a raster display and, in particular, an invertible look-up table for use in displaying a cursor on a background of a raster display.

10 Claims, 1 Drawing Sheet

५,४१०,३३१

PROCESS FOR GENERATING AND/OR USING A LOOK-UP TABLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a process for generating a look-up table for use in displaying a highlight object on a raster display and, in particular, an invertible look-up table for use in displaying a cursor on a background of a raster display.

2. Description of Related Art

Nearly every interactive computer program must display a highlight object of one form or another, such as a cursor, on a background of a display. Two techniques are commonly used to allow the cursor to be visible.

One conventional technique is to use the exclusive—OR operator to replace a value in a display buffer with another value to make a cursor visible. This technique has the advantages of being very computationally efficient, and having perfect spatial resolution. The problem with this technique is that it can produce a very low visibility cursor in displays which are not binary since the result of inverting the bits of a color are unpredictable.

The second conventional technique is to read the contents of the display buffer, and store the contents of the area to be effected by the cursor, then write the cursor to the display replacing the background values with the cursor values. This cursor is visible by the nature of the values written. Typically, the cursor has a black body surrounded by a white "halo". This guarantees that either the white or black of the cursor will be visible on the background. This technique is even more computationally efficient than the first technique described, but suffers in spatial resolution. The difficulty is that if the cursor is on a white background, only the black portion is visible. If the cursor is on a black background, only the white "halo" is visible. This is a drawback in that the user cannot know precisely which pixel is being indicated with this cursor type.

An object of the present invention is to allow a cursor to be visible on any background without having to combine the cursor with the background, without sacrificing spatial resolution, and without having to first save the contents of the display for the area to be written with the cursor.

These and other objects of the invention will be clear from the following description.

SUMMARY OF THE INVENTION

The present invention relates to a method for generating a table for use in displaying a highlight on a background on a raster display, each one of the highlight and the background capable of being one of a plurality of colors represented by distinct color indices, comprising:

obtaining a brightness value representative of brightness for each one of the colors;

creating a first look-up table of the color indices versus the brightness values;

generating a list of the color indices having at least a first entry and a last entry in order such that their corresponding brightness values increase or decrease through the list; and creating a second look-up table mapping first indices representing the background colors to second indices representing the highlight colors whereby the first index representing one of the highlight colors is the index half way through the list from the position in the list of the second index representing the background color when the list is treated as an endless loop with the entry right after the last entry being the first entry.

The present invention is further directed to a method for displaying a highlight on a background on a raster display, each one of the highlight and the background capable of being one of a plurality of colors, each of the colors represented by a distinct color index, comprising:

obtaining a first color index corresponding to the color of a pixel in the display;

obtaining a second color index for the pixel in an invertible look-up table corresponding to the first color index for the pixel; and writing a second color corresponding to the second color index in the pixel.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
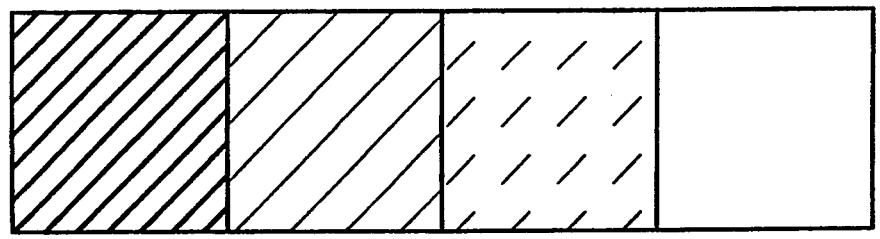
FIG. 1 shows a set of patches illustrating a set of display colors including a black patch, a dark grey patch, a light grey patch and a white patch.

Throughout the following detailed description, similar reference characters refer to similar elements in all figures of the drawings.

The present invention is a method for generating a look-up table for use in displaying a highlight object such as a cursor on a background on a raster display. Each one of the highlight and the background are capable of being one of a plurality of colors. For the purposes of this invention, black, white and shades of grey are defined as being colors along with other typical hues, i.e., red, green, blue, cyan, magenta and yellow. Each of the colors is represented by a distinct color index number or index. In the event that the number of colors is an odd number, an arbitrary color must be added to the number of colors before the first creating step to cause the number of colors to be even.

The first step or step (a) of the method is obtaining a brightness value representative of brightness for each one of the colors. See lines 243—266 of the illustrative software listing in Appendix A just preceding the claims implementing this step.

For the purposes of this invention, brightness means the characteristic of appearance of a stimulus which changes as the intensity of the illumination changes, i.e., increasing the intensity of illumination increases brightness. Since appearance is a purely perceptual phenomenon, by definition, brightness cannot be directly measured. Many systems have been developed which attempt to define a numerical relationship between a measured quantity and brightness. Some of these systems include: log luminance which is based on the Weber-Fechner Law that brightness is proportional to the log of the luminance, the ratio scale of brightness versus luminance developed by Stevens which holds that brightness is proportional to the luminance to some power where the power is close to $\frac{1}{3}$. Neither of these systems was intended to deal with colors other than greys. Other systems have been developed to try to define the appearance of colored samples (of which greys are a sub-set) where one of the components of appearance is brightness. These systems are largely based on work done by the Commission internationale dEclairage (CIE) in the early part of the 20th century. Some of the systems based on this work by the CIE include the xyY color system in which the Y component represents luminance, and is therefore related to brightness. More recent adaptations of the CIE include the L*a*b* system in which L* is related to brightness, and is derived using a $\frac{1}{3}$ power function, and the YIQ system developed by the National Television Standards Commission (NTSC) in which the Y component represents luminance. For a more detailed explanation of these systems and methods for computing or measuring values which are related to or representative of brightness, see Foley and Van Dam, "Fundamentals of Interactive Computer Graphics," Addison-Wesley Publishing Company, pages 602-622.

Each of these currently available methods of computing or measuring a value which is related to or representative of brightness is useful within some set of conditions. Since there are many methods already available (none of which is perfect), the term "a brightness value" will be used herein to mean any value related to or representative of brightness derived by any method which has been chosen to be appropriate to the application at hand which may or may not be one of the methods described above.

Second or step (b), a first look-up table is created where the table correlates the color indices versus the brightness values. See lines 125-137 of the illustrative software listing in Appendix A implementing this step.

Third or step (c), a list of the color indices having at least a first entry and a last entry is generated in order of the brightness values. More specifically, the list is generated such that the brightness values corresponding to the color indices increase or decrease from the first entry to the last entry through the list. See lines 165-206 of the illustrative software listing in Appendix A implementing this step.

Fourth or step (d), a second look-up table is created mapping first indices representing background (or display) colors to second indices representing the highlight object or highlight (or cursor) colors whereby the first index representing one of the highlight colors is the index half way through the list from the position in the list of the second index representing the background color when the list is treated as an endless loop with the entry right after the last entry being the first entry. See lines 138-158 of the illustrative software listing in Appendix A implementing this step. It should be noted that the second look-up table needs to be recomputed any time the colors in the plurality of the colors changes. Further, to convert the display color of more than one display pixel to corresponding cursor colors using the second look-up table, preferably the second look-up table is stored in memory and reused for each pixel, rather than recalculated for each pixel.

If the second look-up table is used to display a highlight such as a cursor, the method includes the steps of (e) obtaining the first color index representing one of the background colors displayed on a pixel in the display; (f) obtaining the second color index representing the highlight color to be displayed in the pixel in the second look-up table corresponding to the first index for the pixel; and (g) writing the highlight color corresponding to the second index in the pixel.

One of the features of this invention is that the second look-up table is invertible, i.e., 1 maps to 3, and 3 maps to 1. In other words, if we write a display pixel twice using the second look-up table both times, the original color is restored on the display. Since it is invertible, the following additional steps can be performed: (h) obtaining the second index representing one of the highlight colors displayed on a pixel in the display; (i) obtaining the first index representing the background color to be displayed in the pixel in the second look-up table corresponding to the second index for the pixel; and (j) writing the background color corresponding to the first index in the pixel.

The present invention can be further described as a method for displaying a highlight on a background on a raster display, each one of the highlight and the background capable of being one of a plurality of colors, each of the colors represented by a distinct color index. In this regard, a first one of the color indices corresponding to the color of a pixel in the display is obtained. Then a second one of the color indices for the pixel is obtain from the invertible look-up table (described and illustrated above) corresponding to the first color index for the pixel. Then a second one of the colors corresponding to the second color index is written (colored or displayed) in the pixel.

In the present invention, the highlight object is always a different color from the background. In other words, every background color uses or has assigned to it a unique highlight object color. The highlight object is always visible with respect to the background because the highlight object is background-dependent. Further, the highlight object is drawn using only colors already used in the background.

The following simple example will illustrate the invention. In this example, the plurality of colors that are capable of being displayed are defined as black, dark grey, light grey and white. These colors are illustrated by four patches in FIG. 1. Each of the colors is assigned a distinct color index. Specifically, 0 is assigned to black; 1 is assigned to dark grey; 2 is assigned to light grey; and 3 is assigned to white. In this case, the first step (a) of the method is accomplished by assuming that the brightness values representative of brightness of the colors are those illustrated in the second row of Table 1 provided below. These brightness values can be, for instance, the display values available from the computer that is used to generate the color patches. In Table 1, these brightness values are in terms of percent brightness where black has a zero percent (0%) value and white has a 100% value. The second step (b) of the method is to create a first look-up table of the color indices versus the brightness values which is, in effect, Table 1.

TABLE 1

First Look-Up Table

| 0 | 1 | 2 | 3 | Color Index |
|---|---|---|---|---|
| 0 | 45 | 65 | 100 | Brightness Value in % |

Next—(c), a list of the color indices having at least a first entry and a last entry in order of the brightness values is generated. The list for this example is provided in a second row of Table 2 as follows.

TABLE 2

List in 2nd Row

| 0 | 1 | 2 | 3 | Order of Brightness Values |
|---|---|---|---|---|
| 0 | 1 | 2 | 3 | Color Index List |

Then (d) the second look-up table is generated as illustrated in Table 3 below.

TABLE 3

Second Look-Up Table

| 0 | 1 | 2 | 3 | First or Background Color Index |
|---|---|---|---|---|
| 2 | 3 | 0 | 1 | Second or Highlight Color Index |

Figure 2:
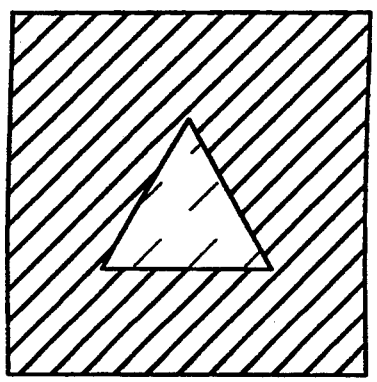
FIG. 2 illustrates a display with a black background and a light grey cursor.
Figure 3:
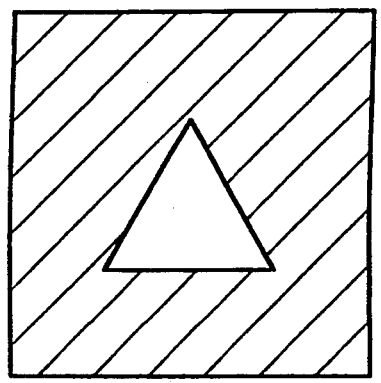
FIG. 3 illustrates a display with a dark grey background and a white cursor.
Figure 4:
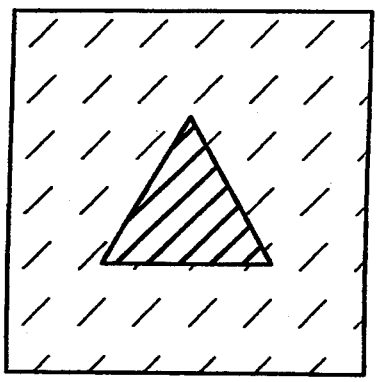
FIG. 4 illustrates a display with a light grey background and a black cursor.
Figure 5:
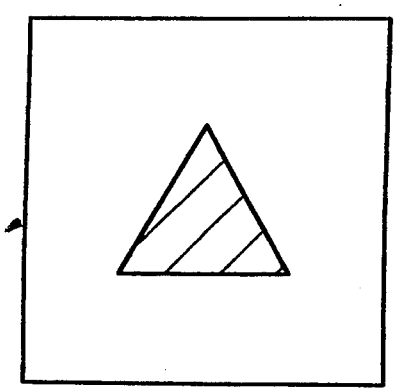
FIG. 5 illustrates a display with a white background and a dark grey cursor.

This second look-up table tells us that if we read a background color having an index 0 from the display we should write the highlight object on the display using the color with the index 2. This background color and highlight color combination is illustrated in FIG. 2. If we read the background color with an index 3 from the display, we write the highlight object using the color having the index 1. This background color and cursor color combination is illustrated in FIG. 5. FIGS. 2-5 illustrate the four possible combinations of background color and highlight or cursor color under the above example.

Notice that the second look-up table is invertible. This means if we write the highlight or cursor twice using the second look-up table, the original color is restored. For instance, if we read a first color corresponding to index 0 from a pixel in the display, we write or color the pixel using the second color corresponding to the second index 2. We then read the color corresponding to index 2 from the display because we just put the cursor there. Now this index 2 can be considered either the first index or the second index in the second look-up table since the table is invertible. Then, in either case, we write the color corresponding to index 0 thus restoring the original color.

A second example is provided where the set of colors contains 8 entries including red, green, blue, cyan, magenta, yellow, black and white. Table 4 provides these colors, corresponding indices and corresponding Red, Green, Blue (RGB) percentages in an indexed array.

TABLE 4

| Index | Red | Green | Blue | Name |
|---|---|---|---|---|
| 0 | 100 | 0 | 0 | red |
| 1 | 0 | 100 | 0 | green |
| 2 | 0 | 0 | 100 | blue |
| 3 | 100 | 100 | 0 | yellow |

TABLE 4-continued

| Index | Red | Green | Blue | Name |
|---|---|---|---|---|
| 4 | 100 | 0 | 100 | magenta |
| 5 | 0 | 100 | 100 | cyan |
| 6 | 0 | 0 | 0 | black |
| 7 | 100 | 100 | 100 | white |

First—step (a), values representative of brightness for each one of the colors are obtained. For this example, we will use the National Television Standards Commission (NTSC) recommended weights for converting the RGB values used in a television phosphor to an equivalent luminance value (representative of visual brightness) represented by Y in the YIQ color model. The following formula is used because it is simple, fast to compute, and is appropriate to this application since the colors in the example are RGB colors presumably being displayed on a monitor.

$$NTSC\ Luminance\ value = 0.30*R + 0.59*G + 0.11*B$$

Applying these weights to the colors in Table 4, we obtain values representative of brightness (i.e., the NTSC Luminance values) for each one of the colors. These values are listed in Table 5 below which relates color index to brightness values.

Second—step (b), a first look-up table of the color indices versus the brightness values is created which is Table 5.

TABLE 5

First Look-Up Table

| 0 | 1 | 2 | 3 | 4 | 5 | 6 | 7 |
|---|---|---|---|---|---|---|---|
| 30 | 59 | 11 | 89 | 41 | 70 | 0 | 100 |

Third—step (c), a list of the color indices having at least a first entry and a last entry in order of the brightness values is generated. In other words, the brightness values in Table 5 are sorted to create a list which ranks the colors in order of brightness. In this example, the darkest color is listed first and the lightest color is listed last. The resulting list is illustrated in Table 6 below.

TABLE 6

List in 2nd Row

| Dar | 0 | 1 | 2 | 3 | 4 | 5 | 6 | 7 | Light |
|---|---|---|---|---|---|---|---|---|---|
| | 6 | 2 | 0 | 4 | 1 | 5 | 3 | 7 | Color Index |

Fourth—step (d), a second look-up table is created mapping the first indices representing background (or display) colors to second indices representing cursor (or highlight object) colors. This second look-up table is illustrated as Table 7 below. In this table, the index representing each cursor color is half way through the list from the position in the list of the index representing the background color treating the list as an endless loop with the entry right after the last entry being the first entry.

TABLE 7

Second Look-Up Table

| 0 | 1 | 2 | 3 | 4 | 5 | 6 | 7 | Background |
|---|---|---|---|---|---|---|---|---|
| 3 | 6 | 5 | 0 | 7 | 2 | 1 | 4 | Cursor color |

An illustrative software embodiment for use by the present invention is included in an Appendix A to this specification. The software program is written in the C programming language and appears immediately before the claims.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A method for displaying a highlight on a background on a raster display, wherein said highlight and said background are comprised of pixels capable of displaying one of a plurality of colors and represented by distinct color indices, comprising:
   (a) obtaining a brightness value representative of brightness for each one of the colors;
   (b) generating a first look-up table of the color indices versus the brightness values;
   (c) generating a list of the color indices having at least a first entry and a last entry in order such that their corresponding brightness values increase or decrease through said list;
   (d) generating a second invertible look-up table by mapping first indices representing the background colors to second indices representing the highlight colors related such that the first index representing one of the highlight colors is the index half way through said list from the position in said list of the second index representing the background color when said list is treated as an endless loop with the entry right after the last entry being the first entry;
   (e) obtaining the first index representing one of the background colors displayed in a pixel in the display;
   (f) obtaining the second index representing the highlight color to be displayed in the pixel in the second look-up table corresponding to the first index for the pixel; and
   (g) writing the highlight color corresponding to the second index in the pixel.

2. The method of claim 1, further comprising:
   (h) obtaining the second index representing one of the highlight colors displayed in a pixel in the display;
   (i) obtaining the first index representing the background color to be displayed in the pixel in the second look-up table corresponding to the second index for the pixel; and
   (j) writing the background color corresponding to the second index in the pixel.

3. The method of claim 1, further comprising: before the first creating step, adding a color when the number of colors is odd to cause the number of colors to be even.

4. The method of claim 1, wherein the plurality of the colors consist of white, black and shades of grey.

5. The method of claim 1, wherein the highlight is a cursor.

6. The method of claim 1, wherein the second look-up table is invertible.

7. The method of claim 1, wherein the second look-up table maps the first indices and the second indices such that the highlight color and the background color corresponding to each mapped pair of the first indices and the second indices are different colors from one another.

8. The method of claim 1, wherein the second look-up table maps the first indices and the second indices such that a different one of the highlight colors corresponds to each one of the background colors.

9. A method for displaying a highlight on a background on a raster display, wherein said highlight and said background are comprised of pixels capable of displaying one of a plurality of colors represented by a distinct color index, comprising:
   obtaining a first color index corresponding to the color of a pixel in the display;
   obtaining a second color index for the pixel in an invertible look-up table corresponding to the first color index for the pixel; and
   writing a second color corresponding to the second color index in the pixel;
   and wherein said invertible look-up table is generated by the following steps:
   obtaining a brightness value representative of brightness for each one of the colors;
   creating a first look-up table of the color indices versus the brightness values;
   generating a list of the color indices having at least a first entry and a last entry in order such that their corresponding brightness values increase or decrease through the list; and
   creating the invertible look-up table mapping first indices representing background colors to second indices representing highlight colors whereby the first index representing one of the highlight colors is the index half way through the list from the position in the list of the second index representing the background color when the list is treated as an endless loop with the entry right after the last entry being the first entry.

10. The method of claim 9, further comprising: before the first creating step, adding a color when the number of colors is odd to cause the number of colors to be even.

* * * * *